J. B. WORCESTER.
VEHICLE WHEEL.
APPLICATION FILED OCT. 23, 1919.
1,410,865.
Patented Mar. 28, 1922.
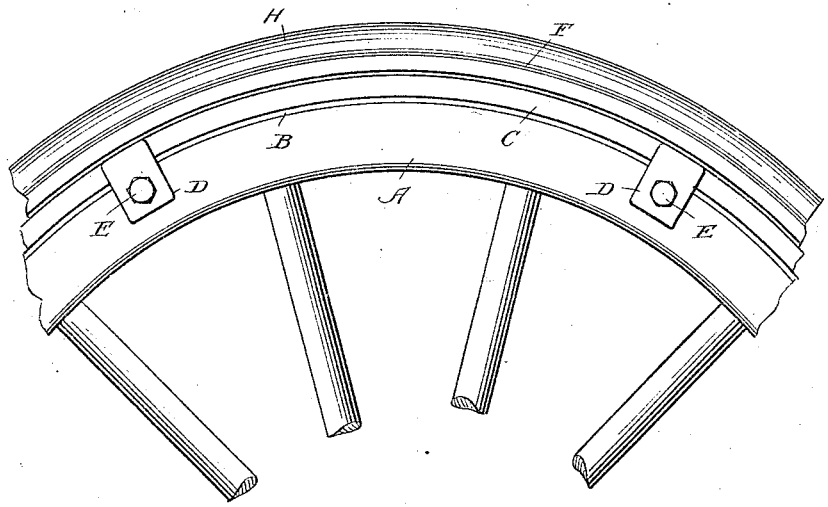
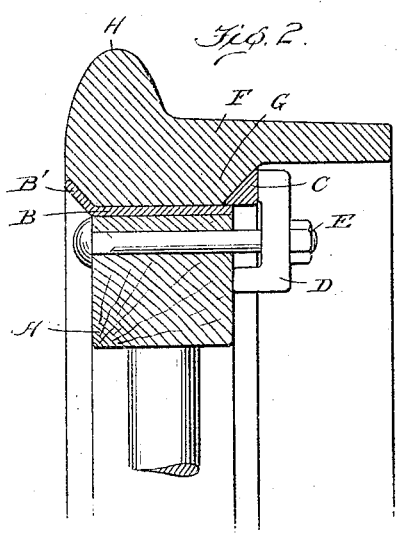
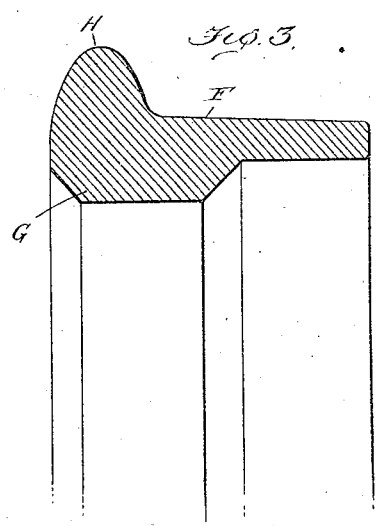
Witness
Edwin L. Bradford
Inventor
James Blaine Worcester,
By
Attorneys

UNITED STATES PATENT OFFICE.

JAMES BLAINE WORCESTER, OF MIDDLETOWN, NEW YORK.

VEHICLE WHEEL.

1,410,865.  Specification of Letters Patent.  Patented Mar. 28, 1922.

Application filed October 23, 1919. Serial No. 332,630.

*To all whom it may concern:*

Be it known that I, JAMES B. WORCESTER, a citizen of the United States, and resident of Middletown, in the county of Orange and State of New York, have invented certain new and useful Improvements in Vehicle Wheels, of which the following is a specification, reference being had therein to the accompanying drawing.

This invention relates to means whereby automobiles are readily adapted to run on either railways or other roads as may be desired at any particular time, and it involves the use, at will, of either a plain or common resilient tire or a steel tire having a circumferential rail-engaging rib or bead.

In the accompanying drawings,

Figure 1 is a side elevation of a portion of a wheel embodying the preferred form of my invention.

Figure 2 is a section on the line 2—2, Figure 1.

Figure 3 is a like section showing the metal tire alone.

In these drawings, A represents the wood felly of a wheel, B the body of a metal rim having on one side a flange B' and encircling the felly and fixed thereto in any approved way, C a tire retaining ring adjusted and retained by the action of clips D forced against the ring by bolts E. All the parts just mentioned are or may be of common form, such as are used in connection with an ordinary resilient tire carried upon a secondary rim which with the tire slips over the rim B when another tire is to be replaced. For use with the parts enumerated I provide a heavy metal tire F having an internal projection G preferably integral with the body and itself integrally continuous around the inside of the tire, and further having an external rib or bead H corresponding exactly to the flange of a common railway car wheel. The projection G is adapted to fit the rim B and to be clamped rigidly between the flange B' and the ring C.

With the construction set forth, the metal tire and the common tire are readily interchanged so that the same vehicle is quickly adapted to run on rails or common roads; and it may be noted that on icy or other roads favorable to skidding, the metal tire will ordinarily run with safety. The essential thing is that the ordinary automobile should be quickly provided with tires having circumferential ribs or flanges adapted to engage tram-way rails, and with ordinary pleasure automobiles, the devices described are preferred. There are, however, special wheels, e. g., those having instead of spokes metal disk centers, or webs, and sometimes it is preferably to detach from the hub the web carrying the usual tire and substitute a web carrying the rib and metal tire. In either case, the automobile with all its driving and controlling mechanism remains absolutely unchanged, the tires carrying with them more or less of the peripheral parts of the wheel, or even the entire wheel. It may be noted that the external and internal projections on the metal tire strongly resist deforming strains.

What I claim is:

The combination with a wheel having a wood felly, of a metal rim encircling and fixed directly to the felly and having on one side an outwardly flaring flange overhanging the felly and on the other side a removable, tire-retaining, wedge-like ring fitting sleeve-like over the non-flanged portion of said rim which it overhangs and having an outwardly flaring surface to co-act with said flange, a heavy steel tire having the outer peripheral surface and single flange of a common cast metal car wheel and provided with an inwardly projecting annular rib closely fitting the peripheral surfaces of said rim, flange and ring, and means for forcibly binding said flange and ring against the interposed tire; whereby load strains are distributed over the entire felly and rim while the steel tire is readily replaced by a common resilient tire for use on common highways.

In testimony whereof I hereunto affix my signature.

JAMES BLAINE WORCESTER.